United States Patent [19]

Leshik et al.

[11] Patent Number: 4,931,302

[45] Date of Patent: Jun. 5, 1990

[54] ASEPTICALLY-PACKAGED, ASPARTAME-CONTAINING PUDDINGS

[75] Inventors: Richard R. Leshik, Ewing Township, Mercer County; Jill P. Dean, Plainsboro, both of N.J.; Dagmar Krimm, Braunschweig, Fed. Rep. of Germany

[73] Assignee: Kraft General Foods, Inc., Glenview, Ill.

[21] Appl. No.: 312,558

[22] Filed: Feb. 17, 1989

[51] Int. Cl.$^5$ ............................................. A23L 1/187
[52] U.S. Cl. .................................... 426/548; 426/579
[58] Field of Search ................................ 426/548, 579

[56] References Cited

U.S. PATENT DOCUMENTS

| | | | |
|---|---|---|---|
| 3,770,461 | 11/1973 | Stewart et al. | 426/579 |
| 4,547,384 | 10/1985 | Kryger | 426/548 |
| 4,623,552 | 11/1986 | Rapp | 426/579 |
| 4,778,075 | 11/1988 | Joseph et al. | 426/579 |

OTHER PUBLICATIONS

Mazur et al., "A New Sugar Substitute," The American Soft Drink Journal, Mar. 1971, pp. 94–95.

*Primary Examiner*—Joseph Golian
*Attorney, Agent, or Firm*—Thomas R. Savoie; Daniel J. Donovan

[57] ABSTRACT

An unsweetened or non-fully-sweetened pudding formulation is prepared and pasteurized or sterilized at high temperature. An acidic, aspartame solution is also prepared, preferably using lactic acid. The acidic solution is passed through a purifying microfilter and combined with the pasteurized/sterilized pudding to produce a stable, aseptic, fully-sweetened pudding having a pH of from 5.3 to 5.9. Preferably, the pH is from 5.5 to 5.7, the pudding is milk-based and the ratio of water to milk proteins in the pudding is from 33–50:1.

6 Claims, No Drawings

ASEPTICALLY-PACKAGED, ASPARTAME-CONTAINING PUDDINGS

BACKGROUND OF THE INVENTION

Consumers have in recent times been desirous of eating wholesome and nutritious snack foods. Milk-containing puddings have long been considered nutritious and wholesome foods. Consumers are, however, requiring that the foods they eat, particularly snack food and dessert items, be essentially ready-to-eat.

Consumers are also desirous of reducing their calorie intake as well as their intake of refined sugars. Aspartame-sweetened products, wherein aspartame (i.e., L-aspartyl-L-phenylalanine methyl ester), replace all or a major part of sugars, such as sucrose, fructose and dextrose, have become quite popular in recent years. Unfortunately, aspartame is not heat stable at normal pudding pH's of about 6.7 and may when subjected to high heat for even a short period of time decompose or break down into non-sweet compounds This has presented a problem for the use of aspartame in foodstuffs which are heat-treated, such as products which must be pasteurized and/or sterilized.

Recently, single-service portions of refrigerated, aseptically-packaged, sugar-sweetened pudding products have entered the market. Formulations and processes for producing such products are described in U.S. Pat. No. 4,788,075 to Joseph et al., which patent is hereby incorporated by reference. As used herein and as recognized in the trade, aseptically-packaged refers to products which are fully aseptic and, thus, are microbiologically shelf-stable for an indefinite period as well as products which have been pasteurized with the intent of being commercially sterile but are marketed as refrigerated products.

SUMMARY OF THE INVENTION

An aseptically-packaged, ready-to-eat, aspartame-containing pudding is produced by means of a novel process. As used in this invention, the term "pudding" is meant to refer to creamy-textured, aqueous formulations having a viscosity comparable to conventional cooked or instant, milk, starch and fat-containing puddings.

The pudding of this invention will contain a thickening agent, such as starch and/or water-binding hydrocolloids, and aspartame either alone or in combination with other sweetening agents (e.g., sugars, saccharine, and the like). As aspartame is utilized to provide an amount of sweetness to the pudding, the pudding will normally be formulated to be a low or reduced calorie pudding. Typically, the puddings of this invention will also contain a protein which may be milk protein, a milk-derived protein (e.g., sodium casienate), or a vegetable Protein (e.g., soy protein). The pudding may or may not contain a fat component.

According to this invention the pudding formulation, minus aspartame, a portion of the water and other heat-sensitive, water-soluble ingredients, is batched, homogenized and then pasteurized or sterilized at a temperature which is sufficient to obtain the desired microbiological stability and to gelatinize any starch contained in the pudding. This formulation is then cooled.

An aqueous, acidified, aspartame-containing solution is then added through an aseptic filter to the pasteurized/sterilized and at least partially-cooled pudding formulation. This, now fully-sweetened, pudding formulation is then aseptically-packaged. Sufficient acid is incorporated into the formulation to attain a Pudding Product which has a pH of from 5.3 to 5.9, preferably about 5.5 to 5.7. This lowered PH environment is required in order to obtain acceptable aspartame stability but is not so low as to impart an acidic taste to the pudding product.

According to a Preferred embodiment of this invention the pudding is a milk based pudding and approximately 20 to 30% of the milk normally contained in such a pudding is replaced with water. This replacement of milk with water enables attainment of the lowered pH using a lower amount of added acid. It is believed that replacement of this minor portion of milk with water reduces the buffering capacity of the pudding due to a reduced level of milk proteins and milk buffer salts. A lowered acid level in the pudding formulation reduces the level of tartness present in the pudding at a given pH and produces an improved flavor, more comparable to conventional acid-free, milk-based puddings.

DETAILED DESCRIPTION OF THE INVENTION

It is conventional to prepare aseptically-packaged, ready-to-eat puddings by batching and homogenizing all of the ingredients and then rapidly heating and cooling the pudding formulation in a series of heat exchangers. In order to minimize the adverse effects of prolonged heating, such as found in retort systems, a HTST (high temperature-short time) heating step is employed with temperature of from 265° to 350° F. (129.4° to 151.7° C.) and time of from 6 to 30 seconds being typical.

Typical pudding products produced according to this invention will contain, in addition to water, an acidulant, aspartame, non-fat milk solids, fat and starch. Additional thickening agents and emulsifying agents may also be included in the pudding formulation. Any percents given are percents by weight and, in the case of puddings containing discrete particles or pieces such as nuts or fruit, the weight percent is basis the pudding phase only.

The starches which may be used in formulating the products of this invention are typically chemically-modified food starches, such as waxy maize starch. Suitable starches are those esterified and etherified starches which are commercially-available and well-known to those skilled in the art and which are further described in the U.S. Code of Federal Regulations at Title 21, Section 172.892.

Fats suitable for use in this invention may be milk fat or various vegetable fats and oils. Coconut and palm kernel oil are suitable vegetable oils. Hydrogenated oils, such as cottonseed, corn, soybean and the like, may also be used.

A suitable emulsifier is sodium stearoyl-2-lactylate which is well-known for use in puddings and is approved for use in puddings at levels up to 0.2%. This material is commercially-available under the name Emplex, a product of Patco Co. of Kansas City, Kansas.

Various flavoring agents and coloring agents, including cocoa, will typically be added to the pudding formulation as is conventionally practiced in the art. An amount of heat-stable intensive sweetener, such as saccharin, or natural sweetener, such as sucrose, may also be present in the pudding formulation.

Any milk component, such as whole, partially-defatted or skim milk, may be added as fluid milk or a combination of milk solids and water, typically to approximate the composition of fluid milk which has a water to milk protein ratio of about 25:1.

Lactic acid is the preferred acidulant for use in this invention, since it is highly compatible with a milk-based pudding formulation. Other acidic food ingredients, such as phosphoric acid, citric acid, monosodium Phosphate and the like, may also be utilized either alone or in combination with each other or with lactic acid.

In the practice of the present invention, all of the ingredients to be pasteurized or sterilized are batched and homogenized, preferably at a temperature of between 125° and 160° F. (51.7 and 71.1° C.). Homogenization preferably takes place in two stages, with the first stage typically operating at a Pressure of at least 1000 psig and the second stage operating at a pressure of at least 400 psig.

After homogenization, the unsweetened or not-fully-sweetened formulation will be cooked and pasteurized or sterilized preferably by means of a HTST heating step. This heating may be effected in a continuous manner making use of one or more swept-surface heat exchangers in order to quickly and uniformly raise the temperature of the formulation to between 265 and 305° F. (129.4 and 151.7° C.). The formulation is maintained within this elevated temperature range for a period of from six to thirty seconds, during which time any starch which is present is fully cooked (i.e., gelatinized) and the formulation is rendered commercially sterile.

In commercial operation it may be necessary to provide an agitated hold tank for the formulation between the homogenization step and the HTST heating step. Hold-up of all or a portion of the formulation results from the fact that the homogenizer is usually fed from a batch-mixing system but the HTST heat exchanger should be operated in a continuous manner. In order to avoid microbial problems, the formulation should be maintained at a temperature of 70° F. (21.1° C.) or below during any hold-up period. Cooling of the formulation after homogenization as well as preliminary heating of the cooled formulation up to a temperature of about 185° F. (85° C.), can readily be effected by the use of non-swept-surface heat exchangers.

After the HTST heat treatment step, the pudding formulation is cooled and combined with an acidic, aspartame-containing aqueous solution. Preferably, the temperature of the pudding formulation will be below 100° F. (37.8° C.) when the acidic solution is added. This acidic solution is passed through a purifying microfilter, such as a 2 micron Pall Emflon™ filter (Pall Corporation, East Hills, Long Island, New York), prior to being combined with the pasteurized/sterilized pudding formulation.

The acidic, aspartame-containing solution will contain only a portion of the water component which is included in the final aseptically-packaged pudding. Water not included in the acidic solution would, of course, be present in the pasteurized or sterilized formulation. The acidic, aspartame-containing solution is added to the cooled, pasteurized or sterilized formulation (PH about 6.4–6.7) in an amount which is effective to produce a fully-sweetened pudding having a pH of from 5.3 to 5.9, preferably about 5.5 to 5.7. Although, as noted above, the puddings of this invention do not necessarily contain milk or other dairy ingredients and non-dairy puddings could be made using a combination of vegetable protein, vegetable fat and thickeners. However, most commercial pudding products will be milk-based. It would be customary in the art to utilize non-fat milk solids (NFMS) or condensed skim milk and water as ingredients so that the weight ratio of NFMS to water in the pudding Product is about 1:9.6. This is the ratio which naturally exists in milk and corresponds to a weight ratio of water to milk protein of about 25:1.

According to a preferred embodiment for a milk-based pudding produced in accordance with this invention, the amount of milk protein and milk buffer salts is reduced in the pudding formula in order to lower its buffering capacity. In this manner, a desired aspartame-stabilizing PH can be reached using a reduced amount of acid. According to this reduced-acid embodiment, the water content of a fully-sweetened, milk-based Pudding will be from 82 to 88% by weight and the ratio of water to milk protein will be from 33 to 50:1.

It may be desirable to add additional hydrocolloid materials to any milk-based Pudding formulation which has a lowered level of milk protein or milk solids. Additional amounts of starch would also be effective for this purpose. A preferred texture has been achieved, however, by a combination of starch and xanthan gum. Levels of starch at from 4.0–4.5% by weight of the pudding formulation in combination with xanthan gum levels of from 0.1 to 0.2%, preferably 0 12 to 0.18%, by weight of the pudding.

For non-milk based puddings which would in their sugar-sweetened form have a PH of about 6.5–7.0, it will also be desirable to minimize the amount of any ingredient, such as protein materials, which exert a buffering effect on the formulation. In this manner, the amount of acid required to achieved the desired APM-stabilizing pH will be minimized and adverse flavor effects will be reduced.

The aseptic-packaging Process includes the steps of sterilizing the containers and lids into which the aseptic pudding is packaged and then filling the container with pudding in an enclosed sterile environment. Such known methods as superheated steam, hydrogen peroxide, ultraviolet light, etc., are useful for sterilizing the packaging materials which, in the case of pudding, are typically comprised of single service, cup-shaped plastic containers and flexible lid stock. The lid stock may be foil-laminated polyester with a heat-sealable coating which will be heat sealed onto the container. The plastic container may be a thermoformed or molded container fabricated from a material such as high-impact polystyrene.

This invention is further described, but not limited, by the following Examples.

EXAMPLE 1

Corn starch-based, aspartame-containing chocolate puddings were prepared using a pudding formulation which had a pH of about 6.5. Various amounts of Phosphoric acid were added thereto to achieve a range of PH's. In this Example, the pudding was prepared using stovetop preparation with all of the ingredients, including aspartame, being subjected to the cooking step It was found that the amount of aspartame lost during the cooking step varied directly with the pH of the formulation, as shown in Table 1.

TABLE 1

| pH of pudding | % aspartame lost during cooking |
|---|---|
| 4.97 | 0 |
| 5.21 | 0 |
| 5.52 | 0 |
| 5.61 | 0 |
| 5.77 | 0 |
| 5.93 | 6 |
| 6.11 | 7 |
| 6.5 | 13 |

The breakdown of aspartame during stovetop would be considerably less than the breakdown experienced during high-temperture commercial preparation of a pudding. In fact, it was found that when the PH 6.5 Pudding formulation of this example was subjected to a HTST heating step at 260° F. (127° C.) the actual loss of aspartame was about 48%.

EXAMPLE 2

The stove-top-cooked puddings of Example 1 were stored in a refrigerator (40° F./4.4° C.) for five weeks and the amount of additional aspartame which was lost (compared to the cooked pudding at zero time) was also found to increase with the pH of the pudding. These results are shown in Table 2.

TABLE 2

| | Additional % Aspartame Lost During Storage | | | |
|---|---|---|---|---|
| | Weeks | | | |
| pH | 1 | 2 | 3 | 5 |
| 4.97 | 0 | 0 | 0 | 1 |
| 5.21 | 2 | 8 | 0 | 0 |
| 5.52 | 1 | 2 | 5 | 7 |
| 5.61 | 2 | 3 | 9 | 9 |
| 5.77 | 7 | 7 | 9 | 12 |
| 5.93 | 6 | 10 | 11 | 16 |
| 6.11 | 9 | 17 | 19 | 26 |
| 6.5 | 15 | 27 | 38 | 39 |

EXAMPLE 3

Corn starch-based, aspartame-containing pudding was prepared using a pudding formulation which had a PH of about 6.5. To one portion of the pudding 0.30% by weight of lactic acid was added resulting in a pH of 5.46. In this Example, the aspartame and acid (if any) were added to the pudding formulation after the cooking step. In this manner the aspartame was not subjected to a cooking step. Aspartame storage stability (at 40° F./4.4° C.) in the pudding is shown in Table 3

TABLE 3

| | % Aspartame Lost During Storage | |
|---|---|---|
| | pH | |
| weeks | 5.46 | 6.5 |
| 1 | 2 | 57 |
| 3 | 6 | 63 |
| 4 | 5 | 65 |
| 5 | 3 | 68 |
| 6 | 6 | — |
| 7 | 8 | — |
| 8 | 4 | — |

EXAMPLE 3

Chocolate-flavored puddings were prepared as follows:

| Formulation | Regular Acid (Weight %) | Reduced Acid (Weight %) |
|---|---|---|
| Milk (2% Fat, 9.24% NFMS) | 87.28 | 62.63 |
| Modified Starch | 4.80 | 4.30 |
| Flavor | .21 | .21 |
| Sodium Stearoyl Lactlylate | .20 | .20 |
| Cocoa | 2.80 | 2.80 |
| Water | 4.19 | 29.26 |
| Lactic-Acid | 0.38 | .31 |
| Aspartame | 0.14 | .14 |
| Xantham Gum | — | .15 |

For both puddings, water and all of the lactic-acid and aspartame were combined to produce an aqueous solution having a solids level of about 11% by weight. The remaining pudding ingredients were combined, heated to 135? F. (57.2? C.), homogenized in a two-stage homogenizer (500 psig first-stage and 2000 psig second stage) and then sterilized at 280? F. (140.6? C.) for 25 seconds. The sterilized pudding was then cooled to 75? F. (23.9? C.) and combined with the aqueous solution after the solution had passed through a 2 micron aseptic filter (Pall Emflon ™ filter) and aseptically packaged. Both puddings had a pH of 5.7; however, the regular acid formulation, which had a water to milk protein ratio of 28 to 1 and a water content of 81.7%, had a slight tart taste. The reduced acid formulation which had a water to milk protein ratio of 41:1 and a water content of 84.8%, has a taste which was equivalent to comparable, sugar-sweetened, acid-free puddings, such as described in the aforementioned Joseph, et al. patent.

Having thus described the invention, what is claimed is:

1. A method for producing aseptically-packaged, ready-to-eat, aspartame-containing pudding comprising:
   (a) preparing an aqueous pudding mixture which is less than fully-sweetened and which contains milk or milk derived protein, thickening agents and a water content of up to 90% by weight;
   (b) homogenizing, pasteurizing or sterilizing and cooling the mixture of step (a);
   (c) preparing an aqueous mixture of an acidic food ingredient and aspartame;
   (d) combining the mixture of step (c) through an aseptic filter with the homogenized, pasteurized or sterilized and cooled mixture of step (b), in an amount which produces a pH in the combined mix of from 5:3 to 5.9 and wherein the combined mix has a water content of from 82 to 88% by weight and the ratio of water to milk protein is from 33–50:1;
   (e) aseptically packaging the mixture of step (d).

2. The method of claim 1 wherein the aqueous pudding mixture contains non-fat milk solids, fat, starch and an emulsifier.

3. The method of claim 2 wherein the aqueous pudding mixture further contains xanthan gum.

4. The method of claim 2 wherein the water content of the mixture of step (d) consists of 1.6–2.0 parts water from milk and 1 part water from added water.

5. The method of claim 1 wherein the acid is lactic acid.

6. The method of claim 1 wherein the pH is from 5.5 to 5.7.

* * * * *